United States Patent
Mussman et al.

(10) Patent No.: US 7,720,084 B2
(45) Date of Patent: *May 18, 2010

(54) ALTERNATE ROUTING OF VOICE COMMUNICATION IN A PACKET-BASED NETWORK

(75) Inventors: Harry Edward Mussman, Bedford, MA (US); John Joseph McCabe, Billerica, MA (US); David Frederick McGuigan, Sudbury, MA (US); Robert Kellar Israel, Westford, MA (US); Eric Richard Sporel, Marlborough, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/017,321

(22) Filed: Jan. 21, 2008

(65) Prior Publication Data

US 2008/0112327 A1    May 15, 2008

Related U.S. Application Data

(63) Continuation of application No. 09/827,352, filed on Apr. 6, 2001, now Pat. No. 7,339,934.

(51) Int. Cl.
*H04L 12/28* (2006.01)
(52) U.S. Cl. .................. 370/401; 370/235; 370/465
(58) Field of Classification Search .................. 370/216, 370/225–229, 230, 230.1, 231, 235, 239, 370/251–256, 389, 395.2, 395.21, 395.31, 370/395.41, 468; 709/204–207, 227, 228, 709/238, 239

See application file for complete search history.

(56) References Cited

U.S. PATENT DOCUMENTS

| 4,284,852 A | 8/1981 | Szybicki et al. |
| 4,679,186 A | 7/1987 | Lea |
| 4,991,204 A | 2/1991 | Yamamoto et al. |
| 5,058,105 A | 10/1991 | Mansour et al. |
| 5,956,339 A | 9/1999 | Harada et al. |
| 6,067,545 A | 5/2000 | Wolff |

(Continued)

FOREIGN PATENT DOCUMENTS

EP    0 966 145    12/1999

(Continued)

OTHER PUBLICATIONS

Loa K. et al.; "Enhanced H. 323 Gateway With IVR Agent and H.323 Gatekeepers", Motorola Technical Developments, Motorola Inc., Schaumburg, IL, vol. 39, Sep. 1999, pp. 120-123.

(Continued)

*Primary Examiner*—Donald L Mills

(57) ABSTRACT

A method for performing alternate and therefore least cost routing in distributed H.323 Voice over IP (VoIP) networks is provided. With this method, the VoIP network consists of a hierarchy of gatekeeper (GK) functions to provide alternate routing, network element redundancy, and scalability. The alternate routing function is performed by a directory gatekeeper with route selection advancing from a first route to a second route by either of two conditions: (1) there are no resources available to terminate the call in the first zone; and (2) a lack of response to the directory GK request for such resources.

20 Claims, 6 Drawing Sheets

U.S. PATENT DOCUMENTS

| | | | |
|---|---|---|---|
| 6,157,636 A * | 12/2000 | Voit et al. | 370/353 |
| 6,366,576 B1 | 4/2002 | Haga | |
| 6,581,104 B1 | 6/2003 | Bereiter | |
| 6,798,786 B1 | 9/2004 | Lo et al. | |

FOREIGN PATENT DOCUMENTS

| | | |
|---|---|---|
| EP | 1 014 633 | 6/2000 |
| EP | 1 035 719 | 9/2000 |
| EP | 1 089 535 | 4/2001 |
| WO | WO 99 14931 | 3/1999 |
| WO | WO 00 75744 | 12/2000 |
| WO | WO 01 05115 | 1/2001 |

OTHER PUBLICATIONS

Pearlman, M. et al., "Alternate Path Routing in Mobile ad hoc Networks", IEEE, New York, 2000.

* cited by examiner

ALTERNATE ROUTING OF VOICE COMMUNICATION IN A PACKET-BASED NETWORK

CROSS-REFERENCE TO RELATED APPLICATIONS

This application is a continuation of U.S. patent application Ser. No. 09/827,352, entitled "Alternate Routing of Voice Communication in a Packet-Based Network," filed Apr. 6, 2001, which is incorporated herein by reference in its entirety.

TECHNICAL FIELD

This invention relates to call routing in packet-based networks, and more particularly to alternate routing (e.g., least cost routing) of calls in a packet-based voice transmission system, for example, Voice over Internet Protocol (VoIP).

BACKGROUND

For many years, the Public Switched Telephone Network (PSTN) has provided a reliable mechanism for transmitting voice communications. However, the reliability of conventional telephone networks comes at high cost. Each established communication link in a conventional telephone network, reserves a bandwidth of 64 kbps for the duration, regardless of the bandwidth actually needed for the communications. A conventional telephone communication link uses a bandwidth of 64 kbps for all transmissions.

In contrast, conventional data communication networks are packet-based with no guarantee of reliability. In such a network, bandwidth is available on a first-come, first-serve basis. In a conventional packet-based network, voice communications may be broken into multiple packets. Packets are transmitted and then reassembled at the destination. Because packets may be lost or may arrive out of sequence, the quality of voice communications may suffer.

In the last few years, efforts have been made to converge data, voice, and video communications in a single network. For example, the International Telecommunication Union Telecommunication Standardization Section (ITU-T) released the H.323 specification for transmitting audio, video, and data across an Internet Protocol (IP) network.

SUMMARY

A directory gatekeeper is provided for performing alternate routing of calls through gateway resources in a distributed network (e.g., H.323 Voice over IP). The directory gatekeeper includes one or more communication devices providing access to resource management gatekeepers. Each resource management gatekeeper is associated with one or more gateway resources. A memory device accessible by the directory gatekeeper stores a list of routes where each route is associated with one of the resource management gatekeepers. A processor receives a request through one of the communication devices, and performs alternate routing by selecting a route from the list of routes using the corresponding resource management gatekeeper to determine resource availability.

In some implementations, the communication devices provide access to networks such as a packet-based network (e.g., an Internet protocol (IP) network), and the public switched telephone network (PSTN).

In some implementations, the directory gatekeeper performs alternate routing of calls by identifying one or more candidate routes based on a received request. Then, for each of the candidate routes, selecting a candidate route, determining if the selected candidate route is available, and sending a response to the received request indicating the available route or if the request can not be satisfied.

A route may be selected from the list of candidate routes in several ways. For example, the least cost route may be selected as the candidate route or candidate routes may be selected at a predetermined ratio. The predetermined ratio can be selected such that the likelihood of choosing each of the candidate routes is substantially equal.

The details of one or more implementations are set forth in the accompanying drawings and the description below. Other features and advantages will be apparent from the description and drawings, and from the claims.

DETAILED DESCRIPTION

Voice over Internet Protocol (VoIP) networks provide one mechanism to transmit voice communication over packet-based networks. The International Telecommunication Union Telecommunication Standardization Sector (ITU-T) has published the H.323 standard for implementing VoIP systems. VoIP networks may be integrated with the Public Switched Telephone Network (PSTN) to provide connectivity between VoIP terminals and traditional telephones connected to the PSTN.

Figure 1:
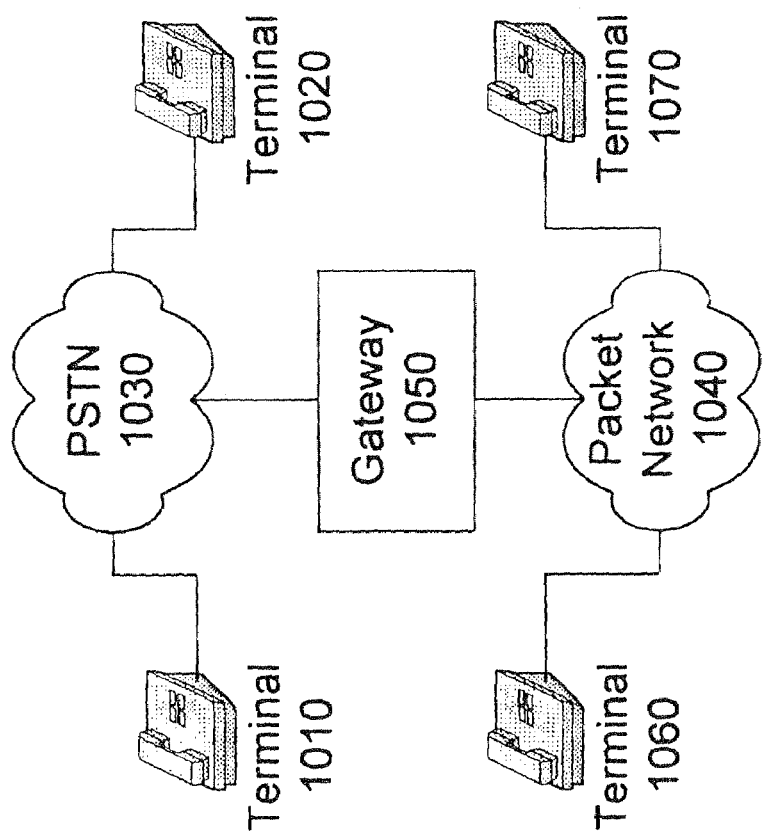
FIG. 1 is a block diagram of a hybrid communication network providing connectivity between a Public Switched Telephone Network (PSTN) and a packet-based network.

Referring to FIG. 1, terminals 1010 and 1020 connect to PSTN 1030 through a communication link, for example, one or more wires, a wireless link, and/or a fiber optic cable. Terminals 1010 and 1020 may transmit data across the communication link using analog or digital signals. Generally, a terminal is connected to the PSTN 1030 through analog, Integrated Services Digital Network (ISDN), or through a TI carrier.

Packet network 1040 connects to PSTN 1030 through gateway 1050. Terminals 1060 and 1070 connect to packet network 1040 using any networking technology, for example, Ethernet, Asynchronous Transfer Mode (ATM), wireless network connection, and/or modem. Terminals 1060 and 1070 may be implemented using any device capable of sending and receiving audio, for example, as telephones, computers, personal digital assistant (PDA), laptop computer, and/or cellular phone.

The configuration shown in FIG. 1 permits voice communication between any of the terminals 1010, 1020, 1060, and 1070. Thus, voice communication may be transmitted from terminal 1010 to terminal 1060 across PSTN 1030 through gateway 1050 to packet network 1040.

Figure 2:
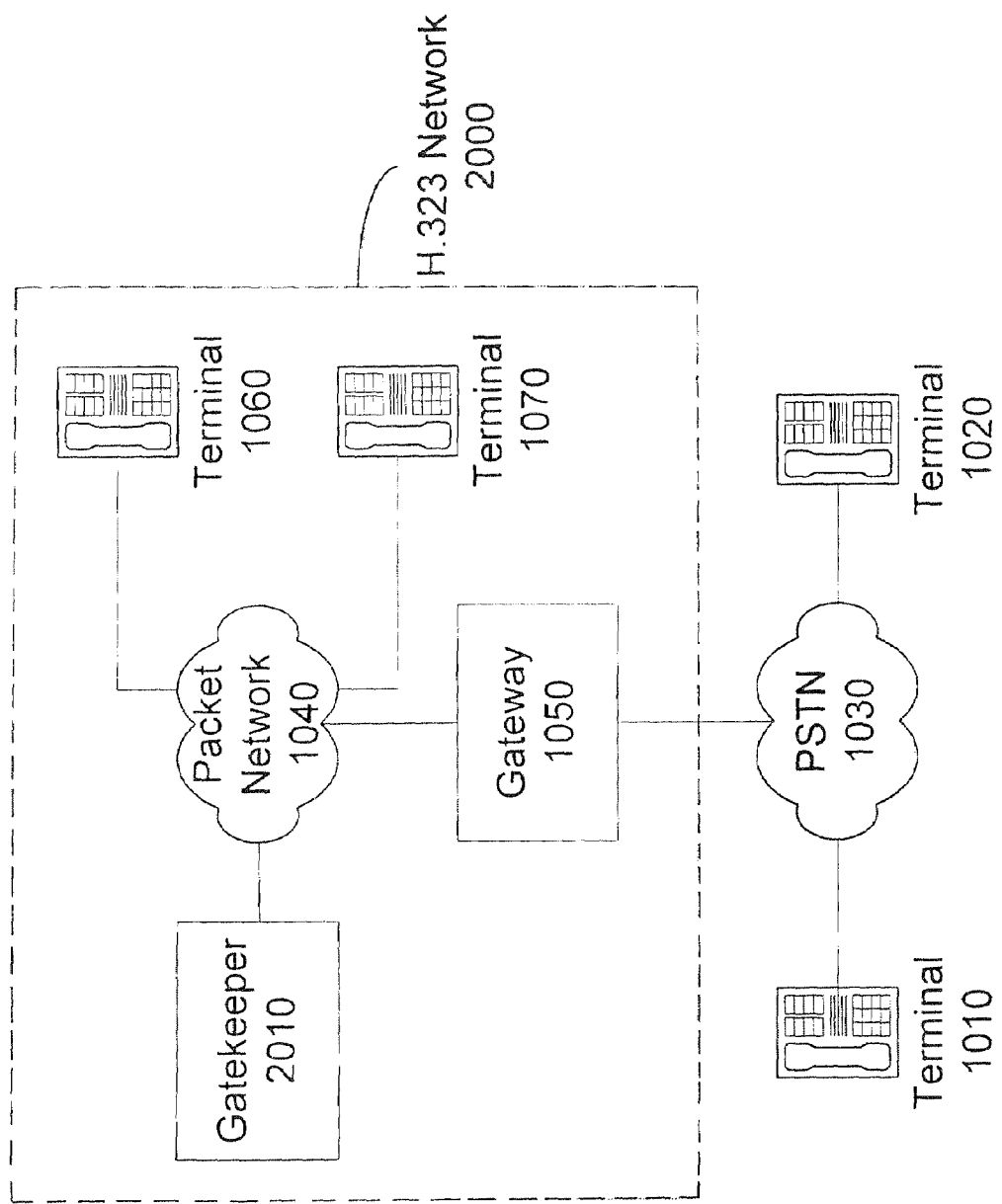
FIG. 2 is a block diagram of an H.323 implementation of a hybrid communication network such as that shown in FIG. 1.

Referring to FIG. 2, an H.323 implementation of the network described in FIG. 1 includes a H.323 network 2000 connected to PSTN 1030 through gateway 1050. The H.323 network 2000 includes terminals 1060 and 1070, Packet Network 1040, and gateway 1050 as described above with reference to FIG. 1. In addition, H.323 network 2000 includes gatekeeper 2010 to provide pre-call and call-level control services to H.323 terminals. The H.323 standard defines call signaling and control, multimedia transport and control, and bandwidth control for point-to-point and multipoint conferences.

Gatekeeper 2010 provides pre-call and call-level control services. For example, one implementation of gatekeeper 2010 provides the following services: (1) address translation to resolve endpoint IP addresses from aliases or standard phone numbers; (2) admissions control to restrict access to terminals or gateways; (3) bandwidth control to manage endpoint bandwidth requirements; (4) zone management capabilities for terminals, gateways, and other devices within a H.323 zone; and (5) call management capabilities, for example, maintaining a list of active calls so that the gatekeeper can determine if a terminal or endpoint is busy.

The demands of gatekeeper 2010 grow as the number of endpoints or terminals increases. At some point, it becomes impracticable to implement the pre-call and call-level control services on a single gatekeeper 2010. One way to overcome the limitations of a single gatekeeper 2010 is to distribute the functionality across multiple devices.

A distributed network architecture increases the ability to scale H.323 VoIP networks for large-scale deployments. In large networks, it may be advantageous to provide alternate routing between two terminals. For example, it may be desirable to route communications across the least expensive link, to balance load across multiple links, or to provide redundant communication paths. In one distributed gatekeeper implementation there is no central repository of current resource availability in an H.323 network (i.e., knowing which circuits in a group (or zone) are busy or idle, and therefore whether there is an idle circuit in the group).

Figure 3:
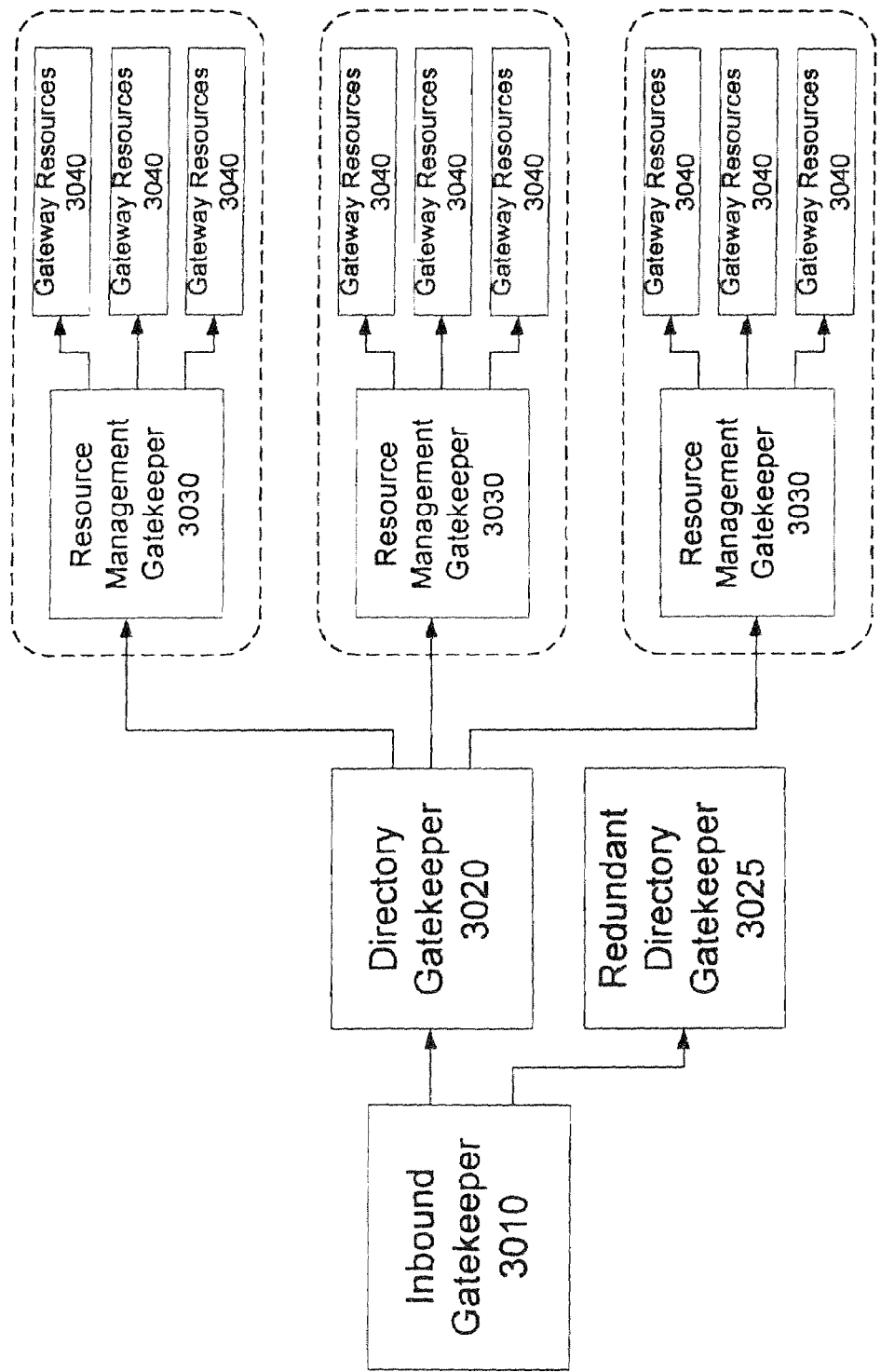
FIG. 3 is a block diagram of a gatekeeper hierarchy showing the relationship between an inbound gatekeeper, a directory gatekeeper, a resource management gatekeeper, and various gateway resources.

Referring to FIG. 3, a hierarchical distributed implementation splits the resource management functionality from the other gatekeeper functions discussed above. The implementation includes an inbound gatekeeper 3010, a directory gatekeeper 3020, a redundant directory level gatekeeper 3025, one or more resource management gatekeepers 3030, and one or more gateway resources 3040.

The directory gatekeeper 3020 manages the desired routing tables for calls. Some implementation the directory gatekeeper 3020 manages least cost routing information. In these implementations, call attempts are sent to directory gatekeeper 3020 for resolution of the appropriate least cost routing information. Based on the desired route selection order, directory gatekeeper 3020 sends a request to a resource management gatekeeper 3030 managing specific outbound gateway resources 3040. If there are gateway resources 3040 available to terminate the call attempt, the resource management gatekeeper 3030 acknowledges the directory gatekeeper 3020 request with the applicable gateway to forward the call to. If there are no gateway resources 3040 available, the resource management gatekeeper 3030 will reject the directory gatekeeper 3020 request. The directory gatekeeper 3020 will then advance the route selection index and send a request to the next resource management gatekeeper 3030 and the process repeats.

If the directory gatekeeper 3020 does not receive a response from the desired resource management gatekeeper 3030, the directory gatekeeper 3020 will also advance to the next resource management gatekeeper 3030, thus providing network redundancy for failure of any individual resource management gatekeeper 3030.

The inbound gatekeeper 3010 interfaces with the source of calls, and sends a routing request to the appropriate directory gatekeeper 3020. If there are gateway resources 3040 available to terminate the call attempt, the resource management gatekeeper 3030 acknowledges the directory gatekeeper 3020 request with the applicable gateway to forward the call to, and this in turn forwarded to the inbound gatekeeper 3010. If the inbound gatekeeper 3010 does not receive a response from the directory gatekeeper 3020, the inbound gatekeeper will advance to the alternate directory gatekeeper 3025, thus providing network redundancy for failure of a directory gatekeeper 3020.

As noted above, the resource management gatekeeper 3030 checks its knowledge of available gateway resources 3040 and acknowledges the directory gatekeeper 3020 request with the applicable gateway to forward the call to. To maintain a current view of gateway resources 3040, the various gateways periodically report their used and available resources to the resource management gatekeeper 3030. This can be done with detailed counts, or simply an indication that the resources in a zone are above or below a given threshold. When a resource management gatekeeper 3030 checks resources, it typically considers all of the gateway resources 3040 in a zone. However, it is sometimes advantageous to exclude certain gateways, and not consider them as candidates for carrying an outbound call. This is advantageous when, for example, the zone contains gateways associated with a given carrier, but where certain calls (say to the 212 area code) should be excluded from certain gateways (say those in New York) to avoid higher intrastate charges. This process may create "holes" in the routing.

Calls are initiated using the H.323 registration, admission, and status (RAS) protocol. In this protocol, a call is initiated by inbound gatekeeper 3010 by sending a location request (LRQ) message to the directory gatekeeper 3020. If the inbound gatekeeper 3010 does not receive a location confirmation message within a predefined time, the inbound gatekeeper 3010 sends another LRQ message to the redundant directory gatekeeper 3025.

Upon receiving a LRQ message from the inbound gatekeeper 3010, the directory gatekeeper 3020 selects the first route of several possible networks capable of terminating Voice over Internet Protocol (VoIP) calls. The directory gatekeeper 3020 issues a location request to the first resource management gatekeeper 3030. If the resource management gatekeeper has knowledge of a gateway resource 3040 that is capable of terminating the VoIP call attempt, the resource management gatekeeper 3030 responds to the directory gatekeeper 3020 with a location confirmation (LCF) message indicating the gateway resource 3040 where the call is to be terminated.

During the lifetime of a call, the resource management gatekeeper 3030 and the gateway resources 3040 provide resource availability information to each other. This resource availability information is required by the resource management gatekeeper 3030 to maintain the appropriate availability information required to properly respond to location requests received by the directory gatekeeper 3020.

If the resource management gatekeeper 3030 does not have knowledge of an available gateway resource 3040 to terminate the call attempt, the resource management gatekeeper 3030 responds to the location request from the directory gatekeeper 3020 with a location reject (LRJ) message indicating the lack of available resources.

If the directory gatekeeper 3020 receives a LRJ message or does not get a response from the resource management gatekeeper 3030 within a specified interval, the directory gatekeeper 3020 will advance to the next route and issue a new location request to a different resource management gatekeeper 3030. The process of sending location requests repeats until no additional routes are available. If no routes are available, the directory gatekeeper 3020 rejects the call request by sending an LRJ message to the inbound gatekeeper 3010.

Figure 4:
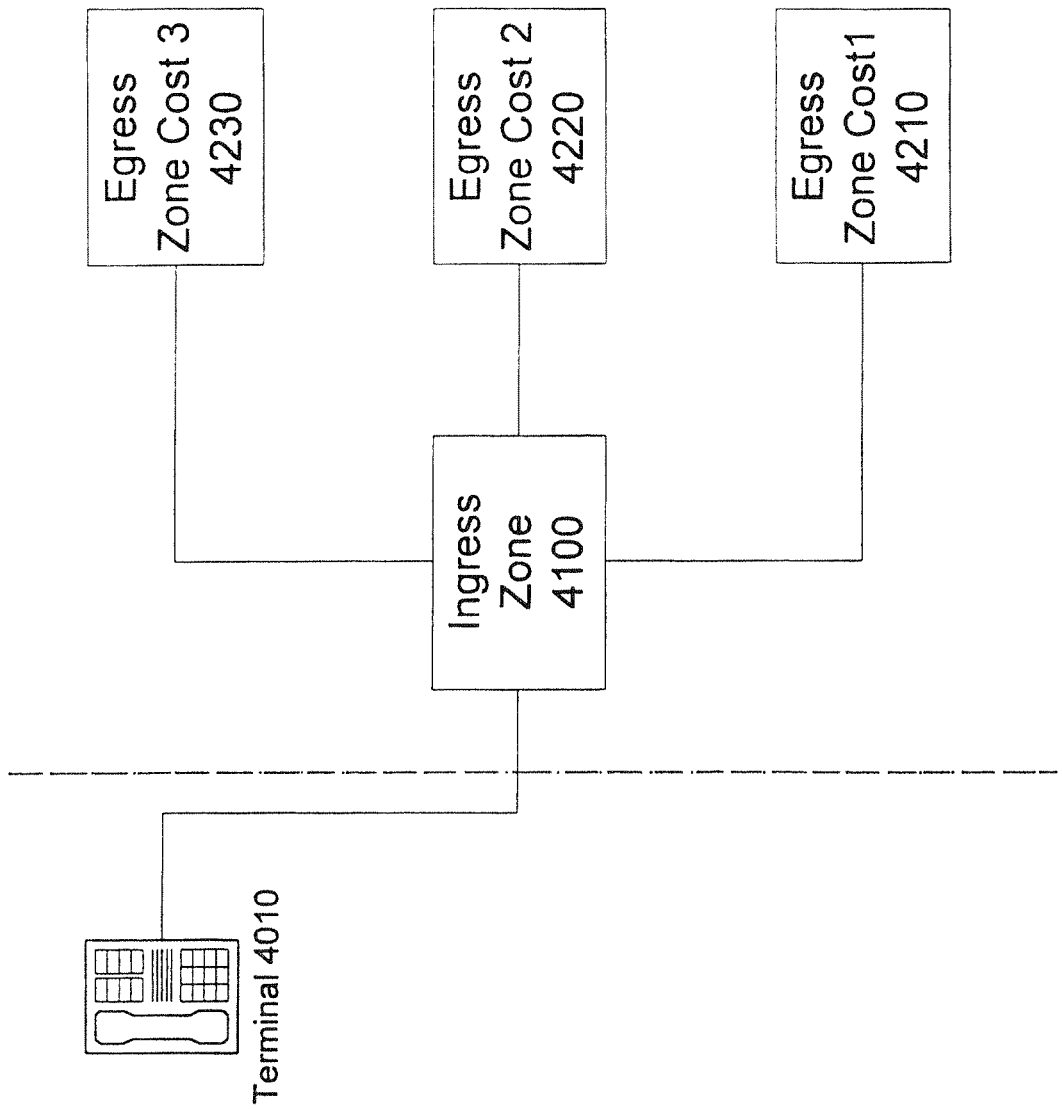
FIG. 4 is a block diagram describing an implementation of least cost routing using a hierarchical gatekeeper configuration such as that shown in FIG. 3.

Referring to FIG. 4, a terminal 4010 connects to ingress zone 4100. Ingress zone 4100 provides access to three egress zones 4210, 4220, and 4230 each having an associated cost or priority. In this example, egress zone 4210 provides access across a private network at the lowest cost; therefore, this zone is given the highest priority. Egress zone 4220 routes calls across another network at a higher cost than egress zone 4210. Finally, egress zone 4230 routes calls across the most expensive network and is therefore given the lowest priority.

Figure 5:
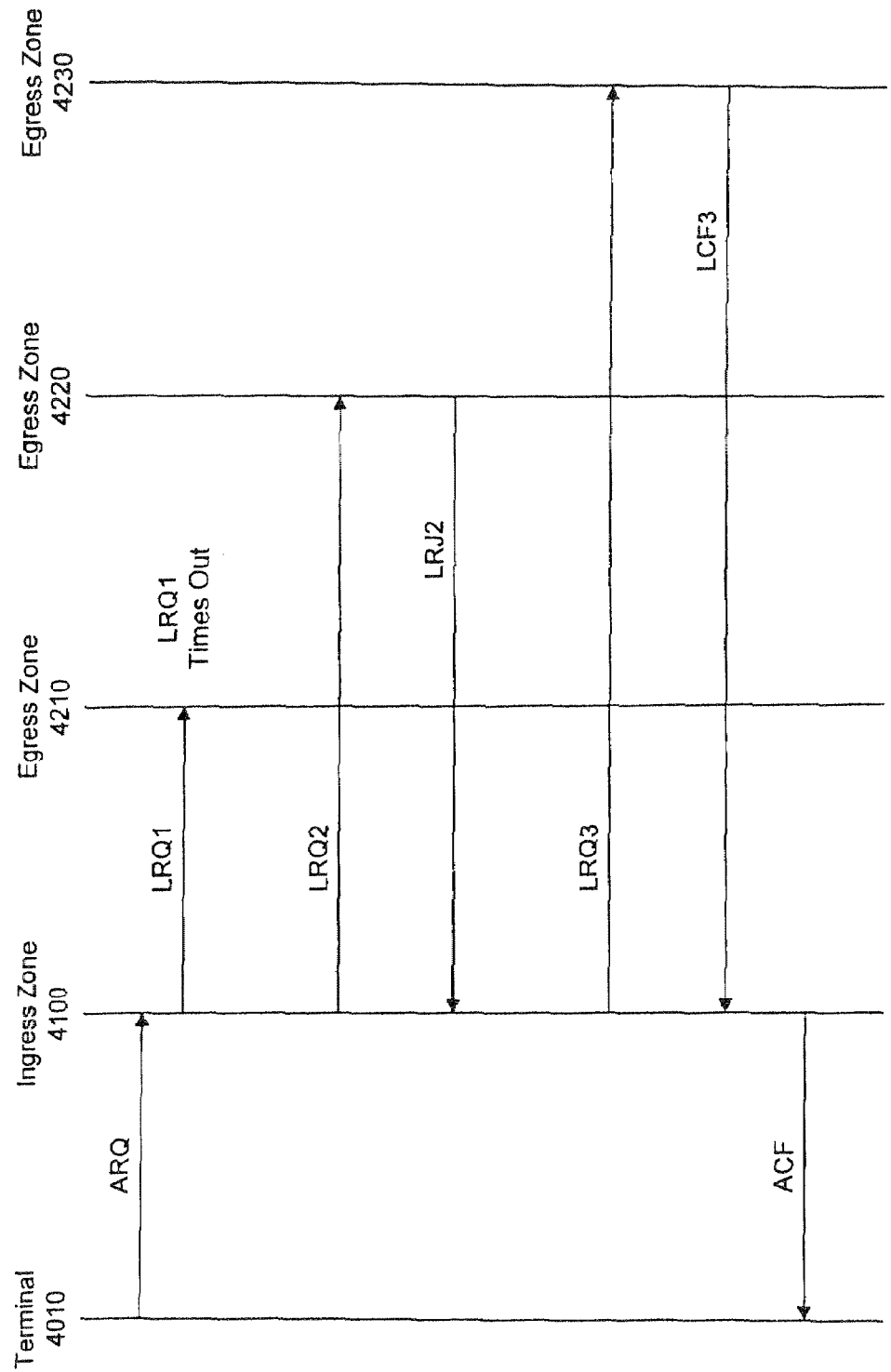
FIG. 5 is a diagram of an exemplary call sequence showing the interactions between the various zones shown in FIG. 4.

FIG. 5 describes an exemplary call sequence that may occur in the network described above with reference to FIG. 4. Terminal 4010 sends an admission request (ARQ) message to ingress zone 4100. A gatekeeper in ingress zone 4100 receives the request and sends a location request (LRQ) message to the least cost zone, egress zone 4210. This LRQ message (designated LRQ1) times out after a predetermined amount of time.

The gatekeeper in ingress zone 4100 then sends an LRQ message to the next highest priority zone, egress zone 4220. Egress zone 4220 determines that resources are unavailable for terminal 4010 to complete a call through egress zone 4210 and so returns a location reject (LRJ) message (designated LRJ2 in FIG. 5). A gatekeeper in an egress zone may be implemented as a resource management gatekeeper 3030 as described above with reference to FIG. 3. Resource management gatekeepers 3030 may reject LRQ messages for the same reasons that location requests are rejected in conventional, single-gatekeeper implementations, for example, insufficient resources are available or the terminal has insufficient authorization.

After receiving LRJ2 from egress zone 4220, the gatekeeper in ingress zone 4100 sends a LRQ message (designated LRQ3) to the next zone on its list, egress zone 4230. The gatekeeper in egress zone 4230 responds to LRQ3 with a location confirmation (LCF) message. When ingress zone 4100 receives LCF3, an admission confirm (ACF) message is sent to terminal 4010. Calls then continue as in a single gatekeeper implementation. In this manner, least cost and alternate routing may be implemented in a structure providing increased reliability and scalability.

Figure 6:
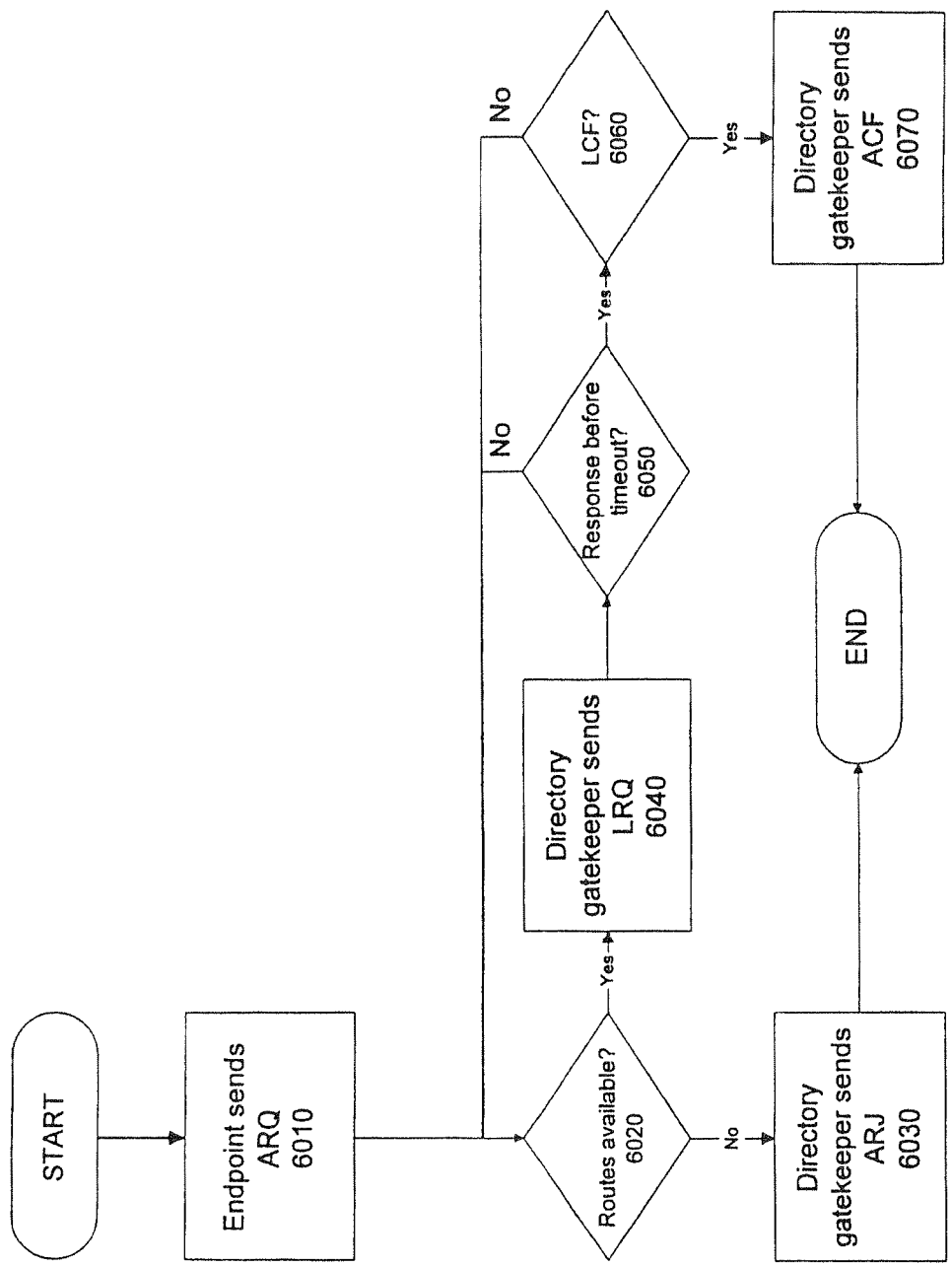
FIG. 6 is a block flowchart of the operation of call setup in a hierarchical gatekeeper configuration.

Referring to FIG. 6, an endpoint device (e.g., telephone, computer, cellular phone) attempting to complete a call to another endpoint device sends an admission request (ARQ) message to a directory gatekeeper (step 6010). The directory gatekeeper maintains a list of available routes. The list may be based on portions of identifications of called endpoint devices. For example, if the called endpoint device is 212-555-1212, the directory gatekeeper may maintain a list of numbering plan areas (NPAs) with corresponding routes. In one implementation, a directory gatekeeper maintains multiple routes to the NPA 212. In some implementation, these routes are maintained by manually configuring the directory gatekeeper; however, other implementations include the ability for a directory gatekeeper to dynamically create routing lists by receiving communications from various resource management gatekeepers.

The directory gatekeeper determines if routes are available (step 6020). If so, the directory gatekeeper sends a location request (LRQ) message to a resource management gatekeeper corresponding to that route (step 6020). Routes may be selected by any criteria. For example, in some implementations, the directory gatekeeper selects the least cost route.

In some implementations, the directory gatekeeper balances the load across multiple routes based on some metric. For example, calls may routed across the first available, randomly-selected route, across the lowest cost available route, and calls may be distributed across two routes at a predetermined frequency (e.g., 40% of calls across one route and 60% across another, first 100 calls per day across one route and the remaining across another).

If no routes are available, the directory gatekeeper cannot terminate the call and sends an admission reject (ARJ) message back to the endpoint (step 6030), thus ending the process.

If routes are available, the directory gatekeeper sends a location request (LRQ) message to the gatekeeper corresponding to the selected route (step 6040). If no response is received before a predetermined timeout interval, then the gatekeeper determines if additional routes are available (step 6020).

If a response is received, the directory gatekeeper determines if the response is a location confirm (LCF) message (step 6060). If so, the directory gatekeeper sends an admission confirm (ACF) message for the available route (step 6070). If confirmation is not received (e.g., a location reject (LRJ) message is received), the directory gatekeeper checks to see if additional routes are available (step 6020). Using the process described in FIG. 6, a hierarchical gatekeeper system provides a mechanism for implementing alternate routing.

A number of implementations have been described. Nevertheless, it will be understood that various modifications may be made without departing from the spirit and scope of the invention. Accordingly, other implementations are within the scope of the following claims.

What is claimed is:

1. A system for routing calls through a network, the system comprising:
    an inbound gatekeeper operable to receive requests to setup data sessions and issue routing requests for determining routes for the requested data session;
    a plurality of resource zones, wherein each zone has an associated resource management gatekeeper and a plurality of outbound gateway resources configured to terminate data sessions received by the inbound gatekeeper; and
    a directory gatekeeper having memory storing a plurality of routes through the resource zones, each route corresponding to one of the resource management gatekeepers, and wherein, in response to a routing request received from the inbound gatekeeper, the directory gatekeeper requests an outbound gateway resource from a resource management gatekeeper associated with a selected route, and
    wherein the selected resource management gatekeeper checks for an available outbound gateway resource among the plurality of outbound gateway resources in the resource zone of the selected resource management gatekeeper,
    wherein if an available outbound gateway resource is identified in the resource zone, the selected resource management gatekeeper notifies the directory gatekeeper of the available outbound gateway resource, and
    wherein if an available outbound gateway resource is not identified in the resource zone, the directory gatekeeper requests resources from another resource management gatekeeper in another zone by selecting another route corresponding to the other resource management gatekeeper.

2. The system of claim 1, wherein each resource management gatekeeper is operable to exclude certain outbound gateway resources during checking for available outbound gateway resources.

3. The system of claim 2, wherein each resource management gatekeeper is operable to exclude certain gateways when the associated zone is associated with a given carrier and the requested call is associated with a given area code.

4. The system of claim 1, wherein the data sessions are voice sessions.

5. The system of claim 1, wherein the plurality of routes through the resource zones includes routes corresponding to a numbering plan area (NPA) associated with the data session.

6. The system of claim 1, wherein the directory gatekeeper manages least cost routing information.

7. The system of claim 1, wherein if the directory gatekeeper does not receive a response from the selected resource management gatekeeper, the directory gatekeeper requests resources from another resource management gatekeeper.

8. The system of claim 1, wherein a data session is initiated by the inbound gatekeeper by sending a location request (LRQ) message to the directory gatekeeper.

9. The system of claim 8, wherein if the inbound gatekeeper does not receive a location confirmation message within a predetermined time, the inbound gatekeeper sends another LRQ message to a redundant directory gatekeeper.

10. The system of claim 8, wherein, upon receipt of the LRQ message, the directory gatekeeper selects the first route of several possible resource zones capable of terminating a data session and issues an LRQ message to the resource management gatekeeper associated with the first route.

11. The system of claim 10, wherein the resource management gatekeeper responds to the location request with a location confirmation (LCF) message indicating the outbound gateway resource where the data session is to be terminated if the resource management gatekeeper has knowledge of an outbound gateway resource capable of terminating the data session or responds to the location request from the directory gatekeeper with a location reject (LRJ) message indicating a lack of available resources.

12. The system of claim 8, wherein, if the directory gatekeeper receives a location reject LRJ message or does not get a response from the resource management gatekeeper within a specified interval, the directory gatekeeper issues a new location request to a different resource management gatekeeper.

13. The system of claim 1, further comprising an endpoint device operable to send an admission request (ARQ) message to the directory gatekeeper.

14. A system according to claim 1, wherein the resource management gatekeeper and outbound gateway resources are operable to provide resource availability information to each other during a data session.

15. A system according to claim 1, wherein each outbound gateway resource is further configured to periodically report the outbound gateway resource's availability to the resource management gatekeeper of the associated resource zone.

16. A system for routing calls through a network, the system comprising:
    an inbound gatekeeper operable to receive requests to setup data sessions and issue routing requests for determining routes for the requested data session;
    a plurality of resource zones, each resource zone having an associated resource management gatekeeper and a plurality of outbound gateway resources configured to terminate data sessions received by the inbound gatekeeper; and
    a directory gatekeeper comprising:
        one or more communication devices communicatively coupled to the plurality of resource management gatekeepers,
        another communication device communicatively coupled to the inbound gatekeeper,
        memory storing a list of routes, each route being associated with a resource management gatekeeper, and
        a processor operable to perform alternate routing.

17. A system according to claim 16, wherein the processor performs alternate routing by selecting one of the routes and sending a resource request to the resource management gatekeeper corresponding to the selected route to initiate the session through one or more outbound gateway resources associated with the selected resource management gatekeeper.

18. A system according to claim 16, wherein the outbound gateway resource availability is used to determine one or more available outbound gateway resource among a plurality of outbound gateway resources associated with the selected resource management gatekeeper.

19. A system according to claim 17, wherein the directory gatekeeper notifies the inbound gatekeeper of the determined available outbound gateway resource to cause the inbound gatekeeper to direct the data session through the available outbound gateway resource.

20. A system according to claim 16, wherein the processor selects a route by performing operations comprising:
    identifying one or more candidate routes based on a received routing request, and
    for each of the one or more candidate routes, selecting a candidate route from the one or more candidate routes.

* * * * *